(12) United States Patent
Nogami

(10) Patent No.: US 8,547,206 B2
(45) Date of Patent: Oct. 1, 2013

(54) APPARATUS, METHOD AND PROGRAM FOR DETECTING DIRECTION OF NONCONTACT IC MEDIUM AND COMPUTER-READABLE RECORDING MEDIUM HAVING THE PROGRAM RECORDED THEREON

(75) Inventor: Hidekatsu Nogami, Kyoto (JP)

(73) Assignee: Omron Corporation, Kyoto (JP)

( * ) Notice: Subject to any disclaimer, the term of this patent is extended or adjusted under 35 U.S.C. 154(b) by 266 days.

(21) Appl. No.: 12/746,047

(22) PCT Filed: Dec. 4, 2008

(86) PCT No.: PCT/JP2008/072014
§ 371 (c)(1),
(2), (4) Date: Jun. 3, 2010

(87) PCT Pub. No.: WO2009/075215
PCT Pub. Date: Jun. 18, 2009

(65) Prior Publication Data
US 2010/0271181 A1  Oct. 28, 2010

(30) Foreign Application Priority Data
Dec. 13, 2007  (JP) .................................. 2007-322253

(51) Int. Cl.
*H04Q 5/22* (2006.01)
(52) U.S. Cl.
USPC ........... 340/10.1; 340/572.1; 342/75; 342/81; 342/147; 342/149; 342/154
(58) Field of Classification Search
USPC ..... 342/74–81, 147–158, 368–371; 343/777, 343/757–766; 340/8.1, 10.1–10.6, 572.1–572.9; 455/67.11
See application file for complete search history.

(56) References Cited

U.S. PATENT DOCUMENTS
4,739,328 A  4/1988 Koelle et al.
5,648,767 A  7/1997 O'Connor et al.
(Continued)

FOREIGN PATENT DOCUMENTS
EP  0 715 185 A1  6/1996
EP  1 610 258 A1  12/2005
(Continued)

OTHER PUBLICATIONS
Office Action from related U.S. Appl. No. 12/675,371 dated Dec. 27, 2012.
(Continued)

*Primary Examiner* — Brian Zimmerman
*Assistant Examiner* — Laura Nguyen
(74) *Attorney, Agent, or Firm* — Dickstein Shapiro LLP

(57) ABSTRACT

A noncontact IC medium direction detecting apparatus (1), method, and computer readable medium are provided. The apparatus (1) includes: receiving means (10) capable of reading a noncontact IC medium (25) in different directional orientations; and information processing means (13) that controls the receiving means, the information processing means being arranged to perform: a first obtaining process of aiming a directional orientation toward a first direction to obtain a signal level of a signal received from the noncontact IC medium having predetermined identification information; a second obtaining process of aiming another directional orientation toward a second direction to obtain a signal level of a signal received from the noncontact IC medium; a composition process of subjecting the signal levels corresponding to the first and second directions to subtraction operation or division to obtain a composite signal level; and an existence direction operating process of obtaining a direction where the noncontact IC medium of interest exists from an operation using the composite signal level.

7 Claims, 6 Drawing Sheets

Rx_Diff···COMPOSITE RECEPTION LEVEL
-a···LOWER THRESHOLD
+a···UPPER THRESHOLD

(56) References Cited

U.S. PATENT DOCUMENTS

| | | | |
|---|---|---|---|
| 5,854,609 A * | 12/1998 | Pyo et al. | 342/359 |
| 6,427,913 B1 | 8/2002 | Maloney | |
| 6,466,771 B2 | 10/2002 | Wood, Jr. | |
| 6,476,756 B2 | 11/2002 | Landt | |
| 6,600,443 B2 | 7/2003 | Landt | |
| 6,900,754 B2 * | 5/2005 | Ono et al. | 342/158 |
| 6,950,009 B1 | 9/2005 | Nysen | |
| 7,239,228 B2 | 7/2007 | Kim et al. | |
| 7,573,418 B2 | 8/2009 | Kawai et al. | |
| 7,978,066 B2 | 7/2011 | Lim et al. | |
| 2005/0280538 A1 | 12/2005 | Kawai et al. | |
| 2006/0082457 A1 | 4/2006 | Artem et al. | |
| 2006/0197652 A1 | 9/2006 | Hild et al. | |
| 2007/0262870 A1 | 11/2007 | Kawai et al. | |
| 2008/0018431 A1 | 1/2008 | Turner et al. | |
| 2008/0278327 A1 | 11/2008 | Nierenberg et al. | |
| 2009/0033463 A1 | 2/2009 | Posamentier | |
| 2010/0271181 A1 | 10/2010 | Nogami | |

FOREIGN PATENT DOCUMENTS

| | | |
|---|---|---|
| JP | 63-029281 A | 2/1988 |
| JP | 10-48306 A | 2/1998 |
| JP | 10-68766 A | 3/1998 |
| JP | 11-326479 A | 11/1999 |
| JP | 2001-230621 A | 8/2001 |
| JP | 2003-215237 A | 7/2003 |
| JP | 2003-344518 A | 12/2003 |
| JP | 2004-252811 A | 9/2004 |
| JP | 2005-503531 A | 2/2005 |
| JP | 2006-10345 A | 1/2006 |
| JP | 2007-33415 A | 2/2007 |
| JP | 2008-3007 A | 1/2008 |

OTHER PUBLICATIONS

Office Action from related U.S. Appl. No. 12/675,371 dated Jul. 23, 2012.

* cited by examiner

F I G. 1
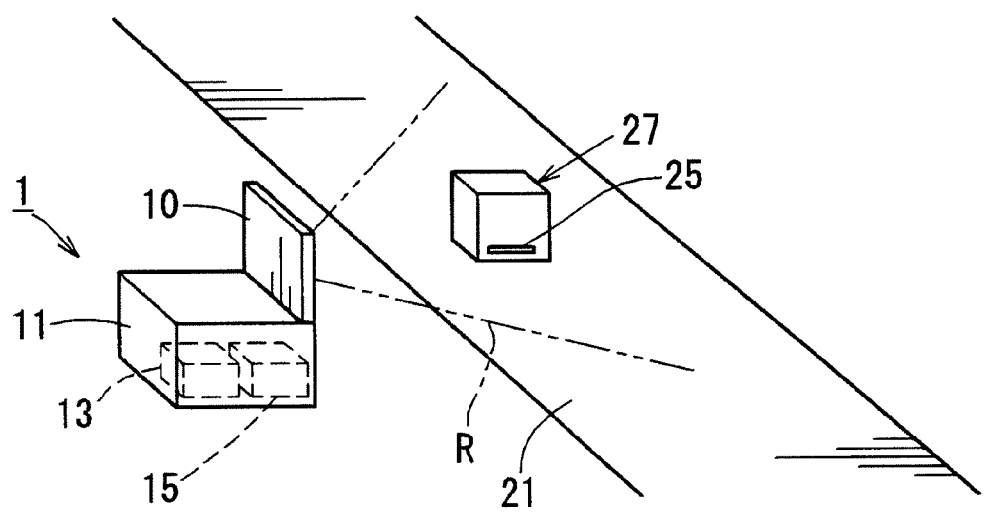
1 ··· RFID DETECTION APPARATUS
10 ··· ANTENNA
13 ··· CONTROL SECTION
25 ··· RFID TAG F I G. 2
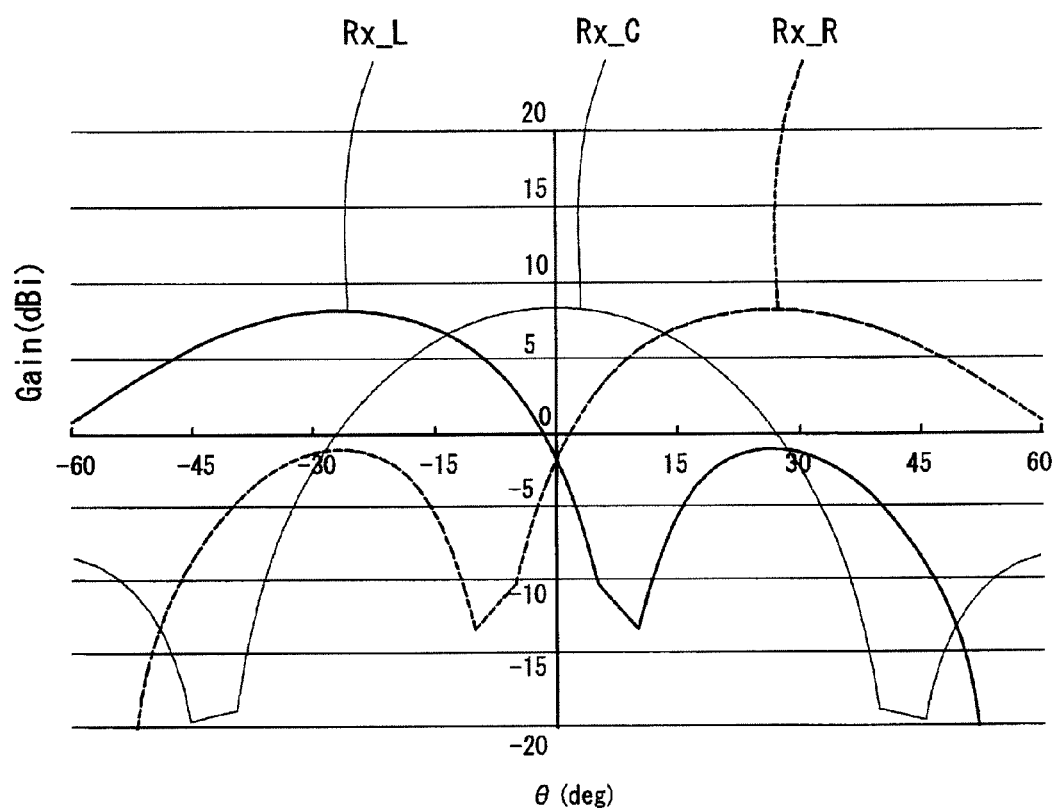
Rx_L, Rx_R···RECEPTION LEVEL
Rx_Diff···COMPOSITE RECEPTION LEVEL Rx_Diff⋯COMPOSITE RECEPTION LEVEL
−a⋯LOWER THRESHOLD
+a⋯UPPER THRESHOLD Rx_Diff···COMPOSITE RECEPTION LEVEL

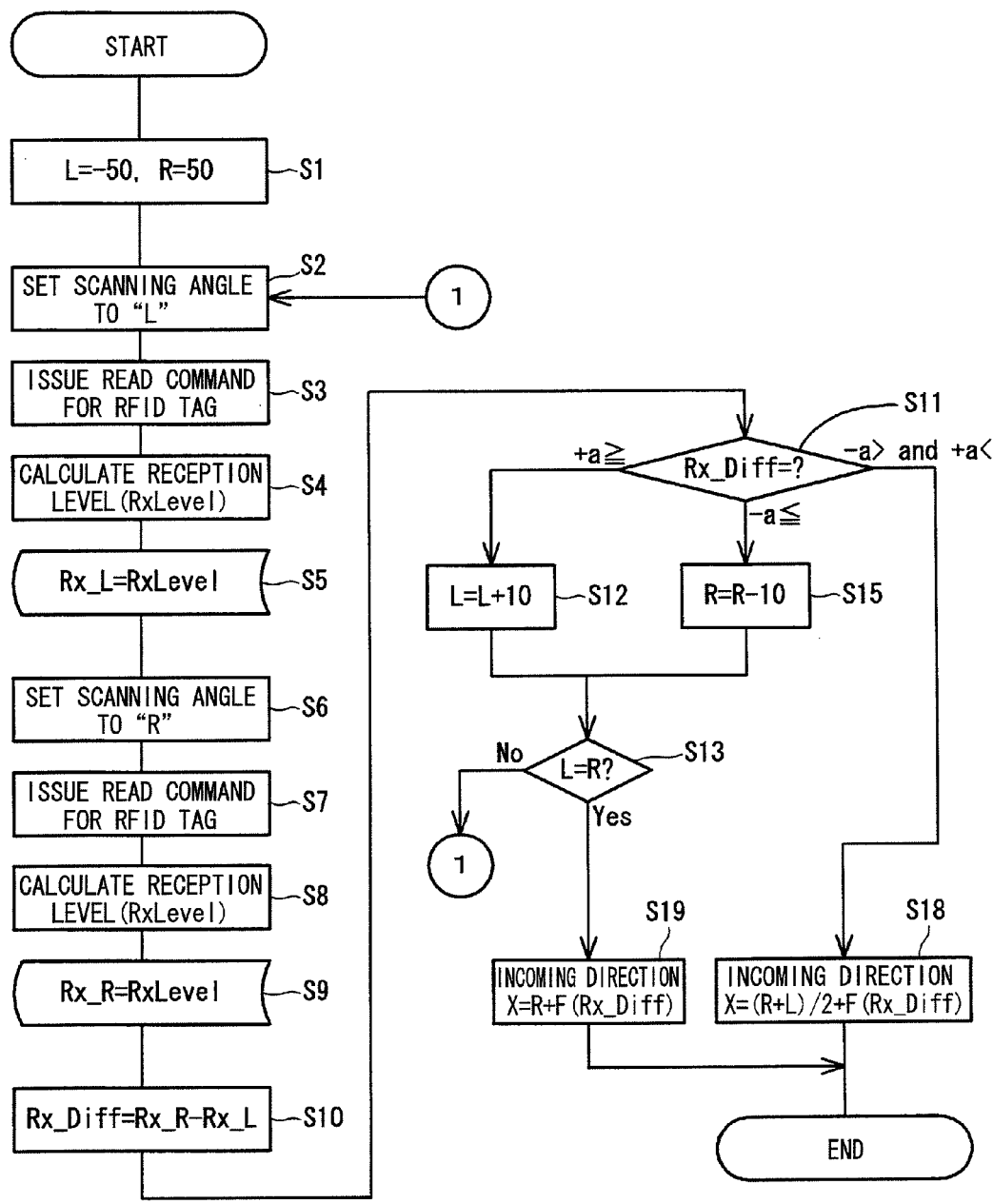

APPARATUS, METHOD AND PROGRAM FOR DETECTING DIRECTION OF NONCONTACT IC MEDIUM AND COMPUTER-READABLE RECORDING MEDIUM HAVING THE PROGRAM RECORDED THEREON

TECHNICAL FIELD

The present invention relates to a noncontact IC medium direction detecting apparatus, for example, which detects a direction where a noncontact IC medium exists, a method therefor, a program therefor, and a computer-readable recording medium having the program recorded thereon.

BACKGROUND ART

Noncontact IC media capable of performing communication of information stored therein in a noncontact manner are conventionally utilized. Such noncontact IC media include a medium using a UHF band available for long-distance communication. In most cases, a single-element patch antenna is used as an antenna for communicating with the noncontact IC medium using the UHF band. The single-element patch antenna has a half-power width (beamwidth) as broad as about 70 and therefore has the advantage of reading information from the noncontact IC media in a broad area.

Meanwhile, there has been proposed a tag communication device that calculates the position of a noncontact IC medium on the basis of estimated incoming direction of a radio wave from the noncontact IC medium (see Patent Literature 1). The tag communication device applies different weights to outputs of antenna elements to detect the intensity of the radio wave in a specific direction.

However, the tag communication device requires complicated calculations in order to find the direction where one noncontact IC medium exists. In addition, the tag communication device is affected by the presence of a reflective object, which requires correction of direction error caused by the reflected object. Thus, the tag communication device cannot easily realize obtaining of the direction where the noncontact IC medium exists.

Patent Literature 1
Japanese Patent Application Publication, Tokukai, No. 2006-10345 A (Publication Date: Jan. 12, 2006)

SUMMARY OF INVENTION

Technical Problem

The present invention has been made in view of the foregoing problems, and an object of the present invention is to provide a noncontact IC medium direction detecting apparatus capable of easily obtaining an existence direction of a noncontact IC medium, a method therefor, a program therefor, and a computer-readable recording medium having the program recorded thereon.

Solution to Problem

The present invention is characterized by being (i) a noncontact IC medium direction detecting apparatus that includes: receiving means capable of reading a noncontact IC medium in different directional orientations; and information processing means that receives information from the receiving means and performs processing of the information, the information processing means being arranged to perform: a first obtaining process of aiming a directional orientation toward a first direction to obtain a signal level of a signal received from the noncontact IC medium having predetermined identification information; a second obtaining process of aiming another directional orientation toward a second direction to obtain a signal level of a signal received from the noncontact IC medium; a composition process of subjecting the signal levels corresponding to the first and second directions to subtraction operation or division to obtain a composite signal level; and an existence direction determining process of determining whether the composite signal level falls within a preset threshold range to determine whether the noncontact IC medium of interest exists in a predetermined direction defined by the threshold range, (ii) a method therefor, and (iii) a program therefor.

The noncontact IC medium can be realized by a medium, such as an RF-ID tag, which can store information and perform communication in a noncontact manner. The noncontact IC medium includes a passive type medium which is not provided with a power source and obtains induced electromotive force from an external entity to transmit a response signal, a semi-passive type medium which is provided with a power source and transmits the response signal in response to a request from an external entity, and an active type medium which is provided with a power source and transmits signals at regular intervals.

The receiving means can be realized by one or more array antennas whose directional patterns can be changed or by a plurality of antennas whose directional pattern cannot be changed.

The information processing means can be realized by means for performing an operation, such as CPU or MPU.

The identification information can be information by which the noncontact IC medium can be identified, such as an ID of the RFID tag.

The composition process can be composition based on subtraction operation for the logarithmic form or division for the antilogarithmic form.

The existence direction operating process can be arranged to find an angle corresponding to the composite signal level according to a preset function or correspondence table.

The predetermined function can be realized by a function, such as a linear function, a quadratic function, or a cubic function, by which an angle can be calculated as a solution when a value of the composite signal level is substituted for one valuable.

The present correspondence table can be realized by a table providing vales of the composite signal level and corresponding angles.

Note that the noncontact IC medium direction detecting apparatus may be realized by a computer. In this case, the present invention also includes a program for detecting a direction of a noncontact IC medium for the noncontact IC medium direction detecting apparatus, wherein the apparatus is realized by the computer by causing the computer to operate as each of the means, and a computer-readable recording medium having the program recorded thereon.

Advantageous Effects of Invention

The present invention can provide a noncontact IC medium direction detecting apparatus capable of easily obtaining an existence direction of a noncontact IC medium, a method therefor, a program therefor, and a computer-readable recording medium having the program recorded thereon.

BRIEF DESCRIPTION OF DRAWINGS

FIG. 1 is an explanatory view of an RFID detection apparatus.

FIG. 2 is a graph showing respective reception levels in different directional orientations.

FIG. 6 is a flowchart of operations performed by a control section of Embodiment 2.

REFERENCE SIGNS LIST

Figure 3:
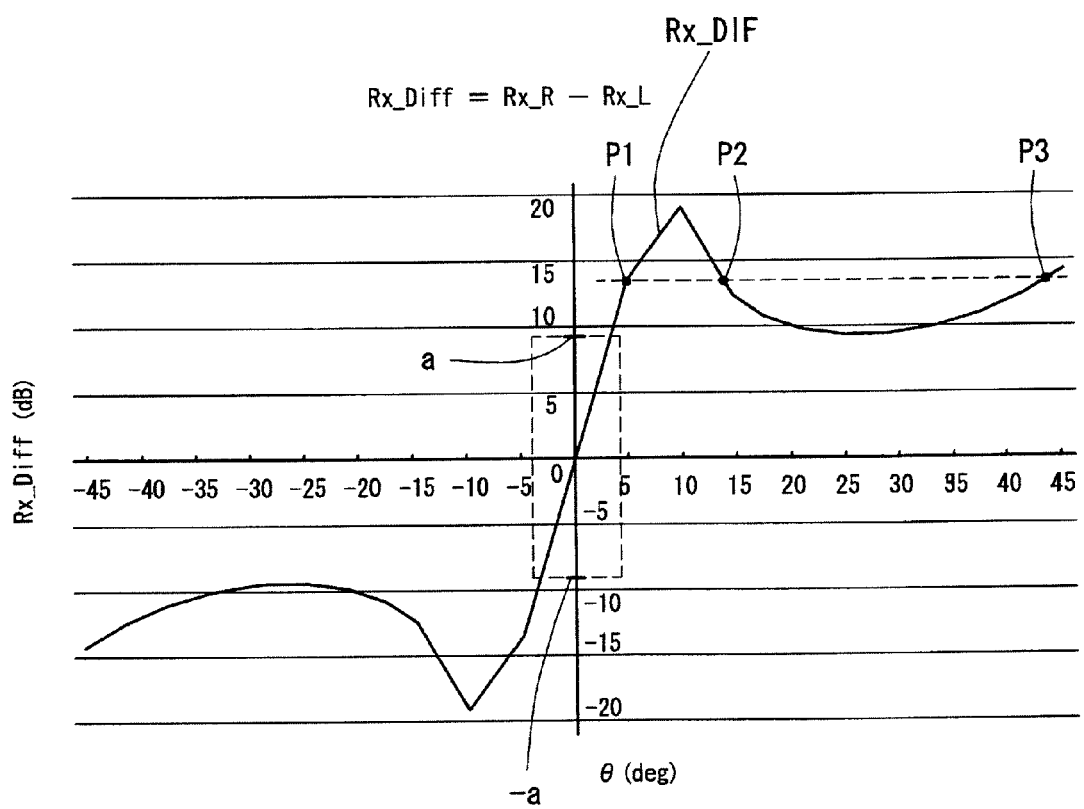
FIG. 3 is a graph of a composite reception level.

1 . . . RFID DETECTION APPARATUS, 10 . . . ANTENNA, 13 . . . CONTROL SECTION, 25 . . . RFID TAG, Rx_L and Rx_R . . . RECEPTION LEVEL, Rx_Diff . . . COMPOSITE RECEPTION LEVEL, −a . . . LOWER THRESHOLD, +a . . . UPPER THRESHOLD

DESCRIPTION OF EMBODIMENTS

The following will describe an embodiment of the present invention with reference to the drawings.

Embodiment 1

FIG. 1 is an explanatory view of an RFID detection apparatus 1.

In this example, an article 27 is placed on a stage 21. The article 27 has a RFID tag 25 attached thereto. The RFID tag 25 includes an antenna and an IC. The IC of the RFID tag 25 has a storage section that stores proper information such as an ID, which is identification information, and a name and specification of the article, which are information on the article.

Near the stage 21, the RFID detection apparatus 1 is placed which can read the RFID tag 25 existing within a detection area R. The RFID detection apparatus 1 includes an antenna 10, a control section 13, and a storage section 15.

The antenna 10 includes a three-element array antenna which can adjust its directional orientations.

The control section 13 includes a CPU, a ROM, and a RAM, and performs control operations and computations according to a program such as an RFID tag direction detection program.

The storage section 15 includes a storage device such as a nonvolatile memory or a hard disk, and stores a program and information (data).

Next, the following will describe the theory of a method for detecting an existence direction of the RFID tag 25 with use of the RFID detection apparatus 1, regardless of distances and performance of the tag.

FIG. 2 is a graph showing respective reception levels in different directional orientations when the RFID detection apparatus 1 reads information from the RFID tag 25. In the graph, a longitudinal axis indicates a reception level (Gain) in units of decibel (dB). A lateral axis indicates an angle in units of degree (deg).

A reception level Rx_L plotted in FIG. 2 indicates how much reception levels in decibels are obtained in given directions where the front side of the antenna 10 is 0°, when the directional orientation (angle θ) of the antenna 10 is set to −35°.

A reception level Rx_C plotted in FIG. 2 indicates how much reception levels in decibels are obtained in given directions where the front side of the antenna 10 is 0°, when the directional orientation (angle θ) of the antenna 10 is set to 0°.

A reception level Rx_R plotted in FIG. 2 indicates how much reception levels in decibels are obtained in given directions where the front side of the antenna 10 is 0°, when the directional orientation (angle θ) of the antenna 10 is set to 35°.

Here, the reception level Rx_L can be expressed by the following equation (Equation 3). Note that relational equations in logarithmic form and antilogarithmic form are expressed by the following equations (Equations 1 and 2).

$$Rx = 10 \times \log_{10}(Rx') \qquad \text{(Equation 1)}$$

$$Rx' = 10^{(Rx/10)} \qquad \text{(Equation 2)}$$

where Rx (dBm) is expressed in logarithmic form, and Rx' (mW) is expressed in antilogarithmic form.

[A] Rx_L in Logarithmic Form $$Rx\_L = Pt + Dt(\theta) - \text{Loss} + D\_L(\theta) \qquad \text{(Equation 3)}$$

where Pt is a transmission power of the tag, Loss is a free space loss, Dt(θ) is a directional gain of the tag, and D_L(θ) is a leftward directional gain, or

[B] Rx_L in Antilogarithmic Form $$Rx\_L' = Pt' \times Dt'(\theta) \times (\lambda/4\pi D)^2 \times D\_L'(\theta)$$

where Pt' is a transmission power of the tag, D is a communication distance, Dt'(θ) is a directional gain of the tag, and D_L'(θ) is a leftward directional gain.

Further, the reception level Rx_R can be expressed by the following equation:

[A] Rx_R in Logarithmic Form $$Rx\_R = Pt + Dt(\theta) - \text{Loss} + D\_R(\theta) \qquad \text{(Equation 4)}$$

where Pt is a transmission power of the tag, Loss is a free space loss, Dt(θ) is a directional gain of the tag, and D_R(θ) is a rightward directional gain, or

[B] Rx_R in Antilogarithmic Form $$Rx\_R' = Pt' \times Dr(\theta) \times (\lambda/4\pi D)^2 \times D\_R'(\theta)$$

where Pt' is a transmission power of the tag, D is a communication distance, Dt'(θ) is a directional gain of the tag, and D_R'(θ) is a rightward directional gain.

Regarding the foregoing two equations, an operation for element reduction composition operation, i.e. subtraction (difference) for the logarithmic form or division for the antilogarithmic form is performed to determine a composite reception level Rx_Diff. The composite reception level Rx_Diff is expressed by the following equation:

(Equation 5)

Rx_Diff in logarithmic form $$\begin{aligned} Rx\_Diff &= Rx\_R - Rx\_L \qquad [A] \\ &= \{Pt + Dt(\theta) - \text{Loss} + D\_R(\theta)\} - \\ &\quad \{Pt + Dt(\theta) - \text{Loss} + D\_L(\theta)\} \\ &= D\_R(\theta) - D\_L(\theta) \end{aligned}$$

Rx_Diff in antilogarithmic form $$\begin{aligned} Rx\_Diff' &= Rx\_R' / Rx\_L' \qquad (B) \\ &= (Pt' \times Dt'(\theta) \times (\lambda/4\pi D)^2 \times D\_R'(\theta)) / \\ &\quad (Pt' \times Dt'(\theta) \times (\lambda/4\pi D)^2 \times D\_L'(\theta)) \\ &= D\_R'(\theta) / D\_L'(\theta) \end{aligned}$$

As expressed in Equation 5, by performing subtraction or division with respect to the equations for reception levels in different directional orientations, a function having only θ irrelevant to distances and performance of the tag (reflected power and directional gains of the tag) is obtained.

This function is shown in graph form in FIG. 3. In the graph, a longitudinal axis indicates the composite reception level Rx_Diff (Gain) in units of decibel (dB). A lateral axis indicates an angle in units of degree (deg).

As shown in the graph, the composite reception level Rx_Diff is expressed in a graph form that appears to be a linear function at about 0°, which is near the front side of the antenna 10. Note that the composite reception level Rx_Diff at angles outside about ±10° is not expressed as a linear function because of a side lobe effect.

Therefore, if the composite reception level Rx_Diff for the RFID tag 25 satisfies a condition given below with use of thresholds −a and a, the existence direction of the RFID tag 25 is easily found by a linear function. The condition is expressed by the following equation:

$$-a < Rx\_Diff < a \qquad \text{(Equation 6)}$$

where −a is a lower threshold and a is an upper threshold.

On the other hand, if the RFID tag 25 falls outside a threshold range from −a to a, it is impossible to detect a precise existence direction of the RFID tag 25 because of the side lobe effect. That is, as shown in FIG. 3, points P1, P2, and P3 are of equal values of Rx_Diff. Therefore, it is impossible to obtain the existence direction of the RFID tag 25 from Rx_Diff.

This problem can be coped with by changing an angle of the directional orientation.

Figure 4:
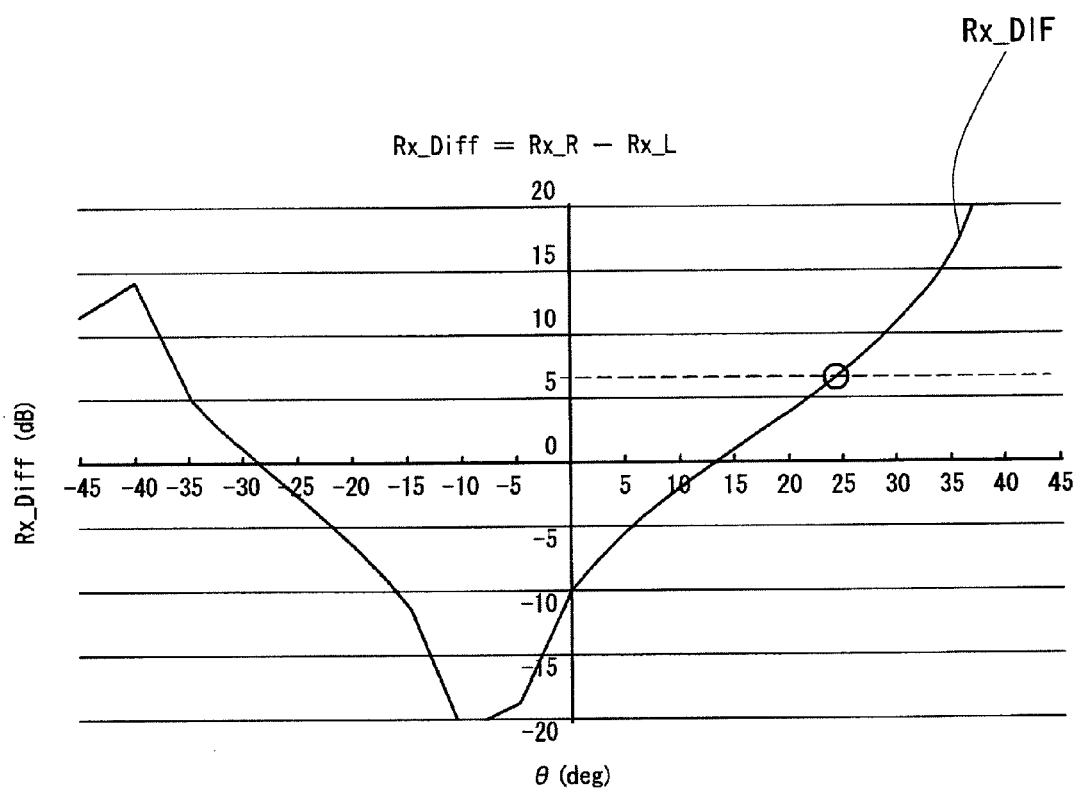
FIG. 4 is a graph of a composite reception level after a directional orientation has been changed.

Here, FIG. 4 shows a graph of a composite reception level RX_Diff when the directional orientation corresponding to the reception level Rx_L is changed to 0° while the directional orientation corresponding to the reception level Rx_R is remained unchanged at 35°.

As shown in FIG. 4, with the change in the directional orientation, the obtained composite reception level Rx_Diff is expressed as a function similar to a linear function (a function with continuously increasing or decreasing values). That is, in this example, from the detection results shown in FIG. 3, it is clear that the RFID tag 25 exists on the right side from the center position. Therefore, an angle of the directional orientation corresponding to the reception level Rx_L to be measured on the left side from the center position is changed to 0° by rightward shift. In this state, the composite reception level Rx_Diff is found. Since it has been already clear that the RFID tag 25 exists on the right side from the center position, the composite reception level Rx_Diff is plotted as a function similar to a linear function when only values on the right side of 0° are seen.

Figure 5:
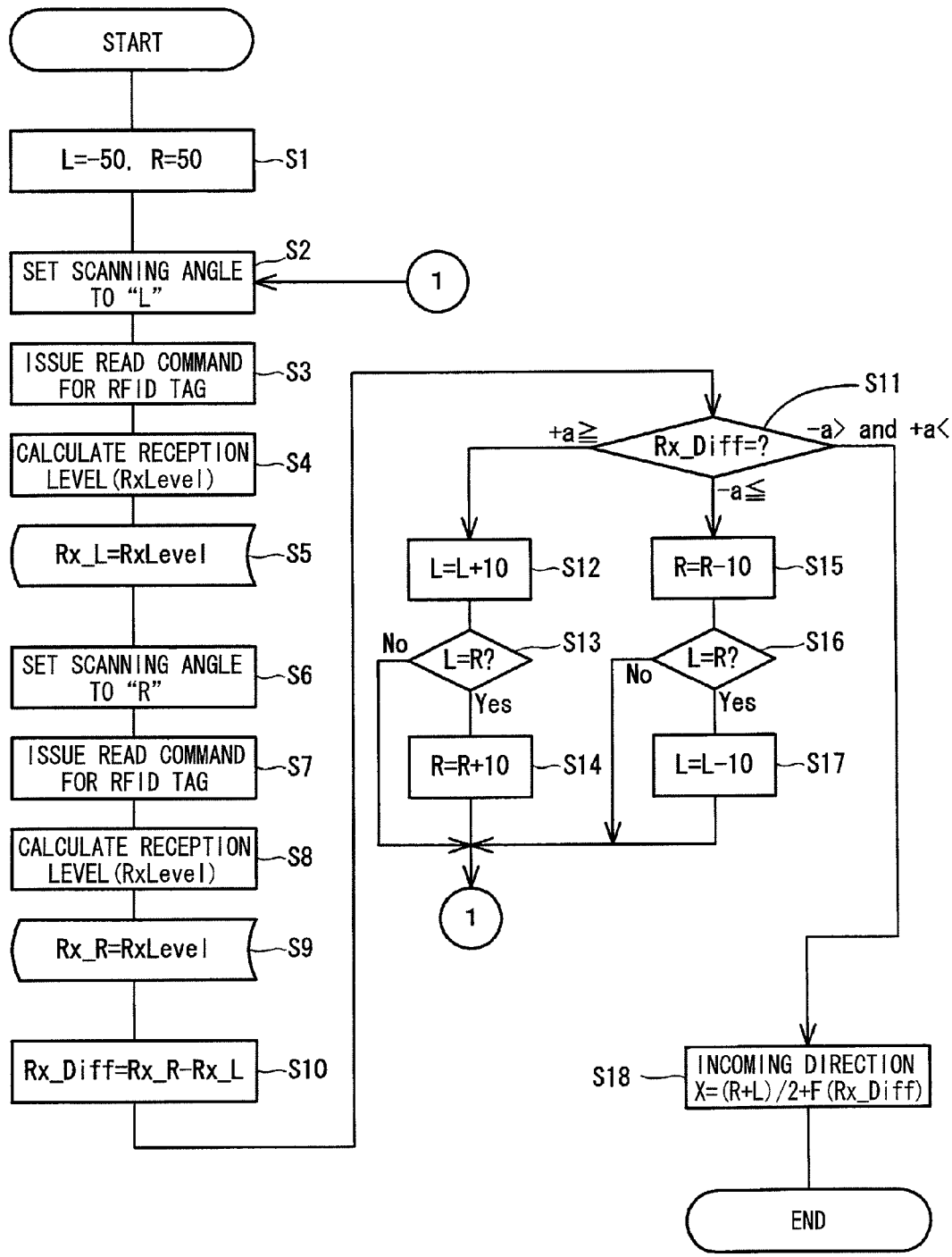
FIG. 5 is a flowchart of operations performed by a control section.

Next, with reference to a flowchart shown in FIG. 5, the following will describe the operations that the control section 13 of the RFID detection apparatus 1 performs in accordance with a RFID tag direction detection program so as to obtain the existence direction of the RFID tag 25 (incoming signal direction) according to the above theory.

The control section 13 performs initial setting (step S1) by assigning an initial value (e.g. −50°) to an angle L of a first direction and then storing the angle L in the storage section 15, and by assigning an initial value (e.g. 50°) to an angle R of a second direction and then storing the angle R in the storage section 15. At the initial setting, it is preferable that the angles L and R are determined to be centrally symmetrical angles.

The control section 13 sets the angle of the directional orientation of the antenna 10 to the angle L of the first direction (step S2), and then issues a read command to a given RFID tag 25 (step S3). At this time, the read command should be such a command that designates an ID that is identification information and requests for a response from only an RFID tag 25 with the designated ID.

The control section 13 calculates a reception level of a response signal (step S4), and then stores the reception level thus calculated as the reception level Rx_L in the storage section 15 (step S5).

The control section 13 sets the angle of the directional orientation of the antenna 10 to the angle R of the second direction (step S6), and then issues a read command to the given RFID tag 25 (step S7). At this time, the read command should be such a command that designates the same ID as designated in step S3 and requests for a response from only an RFID tag 25 with the designated ID.

The control section 13 calculates a reception level of a response signal (step S8), and then stores the reception level thus calculated as the reception level Rx_R in the storage section 15 (step S9).

The control section 13 performs difference operation (subtraction for the logarithmic form and division for the antilogarithmic form) for subtracting the reception level Rx_L from the reception level Rx_R, and then stores the operation result as the composite reception level Rx_Diff in the storage section 15 (step S10).

The control section 13 determines whether the composite reception level Rx_Diff falls within the preset threshold range from −a to +a, whether the composite reception level Rx_Diff is lower than −a, and whether the composite reception level Rx_Diff is greater than +a, so as to roughly determine the incoming direction (step S11). In this process, it is possible to roughly determine whether the RFID tag 25 exists in a centerward direction (within a range of given angles, e.g. a range of angles from −4° to +4), in a leftward direction (on the left side with respect to a given angle, e.g. on the left side with respect to the angle of −4), or in a rightward direction (on the right side with respect to a given angle, e.g. on the right side with respect to the angle of +4).

If the composite reception level Rx_Diff is not lower than +a (+a≥ in step S11), the control section 13 determines that the RFID tag 25 exists on the right side with respect to the centerward direction, and the control section 13 then changes the angle L of the first direction to the right by a predetermined angle (e.g. 10°) (step S12). That is, while the angle R indicating rightward directional orientation is fixed, the angle L indicating leftward directional orientation is changed to the right, whereby the difference in angle between the first and second directions is reduced, and a detection coverage is changed to the right as a whole.

The control section 13 determines whether or not the angle L is equal to the angle R. If the angle L is not equal to the angle R (No in step S13), the control section returns the process to step S2 and repeats the incoming direction estimating process (steps S2 through S11).

If the angle L is equal to the angle R (Yes in step S13), the first direction matches with the second direction. The control section 13 therefore changes the angle R of the second direction to the right by a predetermined angle (e.g. 10°) (step S14). Then, the control section 13 returns the process to step S2 and repeats the incoming direction estimating process (steps S2 through S11).

If the composite reception level Rx_Diff is not higher than −a (−a≤ in step S11), the control section 13 determines that the RFID tag 25 exists on the left side with respect to the centerward direction, and the control section 13 then changes the angle R of the second direction to the left by a predetermined angle (e.g. −10) (step S15). That is, while the angle L indicating leftward directional orientation is fixed, the angle R indicating rightward directional orientation is changed to the left, whereby the difference in angle between the first and second directions is reduced, and a detection coverage is changed to the left as a whole.

The control section 13 determines whether or not the angle L is equal to the angle R. If the angle L is not equal to the angle R (No in step S16), the control section returns the process to step S2 and repeats the incoming direction estimating process (steps S2 through S11).

If the angle L is equal to the angle R (Yes in step S16), the first direction matches with the second direction. The control section 13 therefore changes the angle L of the first direction to the left by a predetermined angle (e.g. −10) (step S17). Then, the control section 13 returns the process to step S2 and repeats the incoming direction estimating process (steps S2 through S11).

If the composite reception level Rx_Diff is lower than +a and higher than −a (−a> and +a< in step S11), the control section 13 performs an incoming direction calculating process of calculating incoming direction X of a signal from the RFID tag 25 when viewed from the antenna 10 (step S18). The incoming direction X is calculated by the following equation:

$$X=(R+L)/2+F(Rx\_Diff) \quad \text{(Equation 7)}$$

where F(Rx_Diff) is a correction equation.

The correction equation F(Rx_Diff) in the above equation can be realized by a function, such as a linear function, a quadratic function, or a cubic function, by which an angle can be calculated as a solution when a value of the composite reception level Rx_Diff is substituted for one valuable. However, the function is not the only possibility. Alternately, the following arrangement may be adopted. For example, data of a table providing values of the composite reception level Rx_Diff and their corresponding angles is pre-stored in the storage section 15 so that a corresponding angle is found with reference to the table.

With the above arrangements and operations, it is possible to easily detect the incoming direction of a signal from the RFID tag 25 and to detect the existence direction of the RFID tag 25.

The antenna 10 is realized by a three-element array antenna, the directional orientations thereof can be instantaneously changed to given angles, and a process of changing the directional orientations and then repeating the incoming direction estimating process can be performed in a short time.

Moreover, the directional orientations are changed until the roughly determined direction of the RFID tag falls within a given range, with respect to the centerward direction, where an angle of the existence direction of the RFID tag 25 can be calculated. This makes it possible to appropriately calculate the existence direction of the RFID tag 25, after adjusting the directional orientations suitably for the existence direction of the RFID tag 25.

Embodiment 2

Descriptions of Embodiment 1 assume that no limit is provided for change in directional orientation of the antenna 10. Descriptions of Embodiment 2 assumes that a limit is provided for change in directional orientation of the antenna 10 or that the RFID tag 25 is not detected if the RFID tag 25 lies in directions outside the range of angles of the directional orientations.

FIG. 6 is a flowchart of illustrating the operations that the control section 13 of the RFID detection apparatus 1 of Embodiment 2 performs in accordance with a RFID tag direction detection program so as to obtain the existence direction of the RFID tag 25 (incoming signal direction). The other arrangements are the same as those of Embodiment 1, and detailed descriptions thereof are therefore omitted.

As shown in FIG. 6, the operations in steps S1 through S13 are the same as those of Embodiment 1, and detailed descriptions thereof are therefore omitted.

In step S11, if the composite reception level Rx_Diff is not higher than −a (+a≥ in step S11), the control section 13 performs step S15 and then causes the process to proceed to step S13, as in Embodiment 1.

After step S12 or S15, the control section 13 determines whether or not the angle L is equal to the angle R. If the angle L is not equal to the angle R (No in step S13), the control section 13 returns the process to step S2 and then repeats the incoming direction estimating process (steps S2 through S11).

If the angle L is equal to the angle R (Yes in step S13), the orientation directions cannot be changed any longer. Therefore, the control section 13 calculates the incoming direction X by adding a correction equation R to the angle R of the second direction. The equation used for the calculation is given by:

$$X=R+F(Rx\_Diff) \quad \text{(Equation 8)}$$

where F(Rx_Diff) is a correction equation.
This makes it possible to detect an approximate incoming direction.

In step S11, if the composite reception level Rx_Diff is lower than +a and higher than −a (−a> and +a< in step S11), the control section 13 performs the same incoming direction calculating process as in Embodiment 1 (step S18).

With the above arrangements and operations, it is possible to obtain the same effect as in Embodiment 1. In a case where the composite reception level Rx_Diff falls within the threshold range, it is possible to detect the existence direction of the RFID tag 25 with the same accuracy as in Embodiment 1. Further, in a case where the RFID tag 25 exists outside the limit of selectable directional orientations of the antenna 10, it is possible to detect an approximate existence direction of the RFID tag 25 with an accuracy lower than the accuracy obtained in the case where the composite reception level Rx_Diff falls within the threshold range.

In the foregoing embodiments, the lower threshold is set to −a, and the upper threshold is set to +a so that their absolute values are equal to each other. However, this is not the only possibility. Alternatively, the upper and lower thresholds may be individually set to different values. In this case, the same operation effect can be obtained.

Further, in steps S3 and S7, a command for requesting for the ID in response rather than designating the ID may be issued. In this case, only a desired ID is extracted to perform processing for each ID in the steps following steps S3 and S7. This makes it possible to calculate the existence direction of the ID of interest.

Still further, in steps S12 and S15, an angle of one of the directional orientations is changed. Alternatively, the angles R and L may be both changed, after which the process is repeated. Also in this case, the angles of the directional orientations are changed to appropriate angles while a scanning coverage is changed, and at the time when the appropriate angles are obtained, it is possible to detect the existence direction of the RFID tag 25.

Note that a remainder (or a quotient) from the directional gains is conclusively required by the equations described in the foregoing embodiments, and the remainder (or the quotient) is obtained as a ratio. Therefore, the foregoing embodiments are described in units of mW or dBm. However, this is not the only possibility. The same result can be obtained even if dBW is used as the unit. Similarly, even with a conversion factor calculated with respect to an isotropic antenna using dBi as the unit as described in the present embodiment, or even with a conversion factor calculated with respect to a dipole antenna using dBd as the unit, which is different from the unit used in the present embodiment, the same result can be obtained.

A noncontact IC medium direction detecting apparatus of the present invention corresponds to the RFID detection apparatus 1 in the embodiment. Similarly, the following will describe correspondences between components in the present invention and components in the foregoing embodiments:

receiving means corresponds to the antenna 10;

information processing means corresponds to the control section 13;

a noncontact IC medium corresponds to the RFID tag 25;

a first obtaining process corresponds to steps S2 through S5;

a repeating process corresponds to steps S2 through S11;

a second obtaining process corresponds to steps S6 through S9;

a composition process corresponds to step S10;

an existence direction determining process corresponds to step S11;

a direction changing process corresponds to steps S12 and S15;

an angle obtaining process corresponds to steps S18 and S19;

signal levels correspond to reception levels Rx_L and Rx_R;

a composite signal level corresponds to a composite reception level Rx_Diff;

a threshold range corresponds to a range from −a to +a;

a first threshold corresponds to −a1;

a second threshold corresponds to +a;

a preset function or correspondence table corresponds to Equation 7 or 8; and identification information corresponds to the ID. However, the present invention is not limited to the configurations of the foregoing embodiments, and many embodiments can be obtained.

The invention claimed is:

1. A noncontact IC medium direction detecting apparatus, comprising:
    a single antenna structure with multiple receiving elements for reading a signal containing information from a noncontact IC medium in different directional orientations; and
    an information processing means that receives the information from the single antenna structure and performs processing of the information,
    the information processing means being arranged to perform:
        a first obtaining process of aiming a directional orientation of the single antenna structure toward a first direction to obtain a signal level of a signal received from the noncontact IC medium having predetermined identification information;
        a second obtaining process of aiming another directional orientation of the single antenna structure toward a second direction, which is different from the first direction, to obtain a signal level of a signal received from the noncontact IC medium having the predetermined identification information;
        a composition process of, in order to determine an existence direction of the noncontact IC medium, subjecting the signal levels corresponding to the first and second directions, which signal levels have been received from the noncontact IC medium having the predetermined identification information, to subtraction operation or division to obtain a composite signal level expressed as one of a continuously increasing function and a continuously decreasing function within a threshold range; and
        an existence direction determining process of, if the composite signal level falls within the threshold range, which is preset according to a combination of the first and second directions, determining that the noncontact IC medium of interest exists in a direction of an angle derived from one of the continuously increasing function and the continuously decreasing function.

2. The noncontact IC medium direction detecting apparatus according to claim 1, wherein the information processing means is arranged to perform:
    when it is determined in the existence direction determining process that the noncontact IC medium does not exist in the direction of an angle derived from one of the continuously increasing function and the continuously decreasing function, a direction changing process of changing at least one of the first and second directions to a different direction; and
    a repeating process of, after the change of the direction, repeating (i) at least one of the first and second obtaining processes at least one of which is performed according to a result of the direction changing process, (ii) the composition process, and (iii) the existence direction determining process.

3. The noncontact IC medium direction detecting apparatus according to claim 2, wherein
    the threshold range is set to a range from a first threshold in the first direction to a second threshold in the second direction,
    the existence direction determining process is arranged such that if the composite signal level falls outside the threshold range, it is determined whether the composite signal level is below the first threshold or above the second threshold, and
    the direction changing process is arranged such that if it is determined in the existence direction determining process that the composite signal level is below the first threshold, an angle of the second direction in the second obtaining process is changed toward the first direction, and if it is determined in the existence direction determining process that the composite signal level is above the second threshold, an angle of the first direction in the first obtaining process is changed toward the second direction.

4. The noncontact IC medium direction detecting apparatus according to claim 1, wherein
    the information processing means is arranged to perform an angle obtaining process of finding an angle corresponding to the composite signal level according to a preset function or correspondence table which is related to determination results obtained in the existence direction determining process.

5. A method for detecting a direction of a noncontact IC medium, using:
    a single antenna structure for reading a signal containing information from a noncontact IC medium in different directional orientations; and
    an information processing means that receives the information from the single receiving means and performs processing of the information, the information processing means performing:

a first obtaining process of aiming a directional orientation of the single antenna structure toward a first direction to obtain a signal level of a signal received from the noncontact IC medium having predetermined identification information;

a second obtaining process of aiming another directional orientation of the single antenna structure toward a second direction, which is different from the first direction, to obtain a signal level of a signal received from the noncontact IC medium having the predetermined identification information;

a composition process of, in order to determine an existence direction of the noncontact IC medium, subjecting the signal levels corresponding to the first and second directions, which signal levels have been received from the noncontact IC medium having the predetermined identification information, to subtraction operation or division to obtain a composite signal level expressed as one of a continuously increasing function and a continuously decreasing function within a threshold range; and an existence direction determining process of, if the composite signal level falls within the threshold range, which is preset according to a combination of the first and second directions, determining that the noncontact IC medium of interest exists in a direction of an angle derived from one of the continuously increasing function and the continuously decreasing function.

6. A non-transitory computer-readable recording medium having recorded thereon a program for detecting a direction of a noncontact IC medium, the program causing an information processing means to perform:

a first obtaining process of aiming a directional orientation of the single antenna structure, which is capable of reading a signal from a noncontact IC medium in different directional orientations, toward a first direction to obtain a signal level of a signal received from the noncontact IC medium having predetermined identification information;

a second obtaining process of aiming another directional orientation of the single antenna structure toward a second direction, which is different from the first direction, to obtain a signal level of a signal received from the noncontact IC medium having predetermined identification information;

a composition process of, in order to determine an existence direction of the noncontract IC medium, subjecting the signal levels corresponding to the first and second directions, which signal levels have been received from the noncontact IC medium having the predetermined identification information, to subtraction operation or division to obtain a composite signal level expressed as one of a continuously increasing function and a continuously decreasing function within a threshold range; and an existence direction determining process of, if the composite signal level falls within the threshold range, which is preset according to a combination of the first and second directions, determining that the noncontact IC medium of interest exists in a direction of an angle derived from one of the continuously increasing function and the continuously decreasing function.

7. The noncontact IC medium direction detecting apparatus according to claim 1, wherein when the composite level falls within the threshold range, an existence direction of the noncontact IC medium of interest is uniquely deter mined based on the composite signal level.

* * * * *